(12) United States Patent
Sanner

(10) Patent No.: US 6,574,908 B1
(45) Date of Patent: Jun. 10, 2003

(54) FISHING LURE WITH SPRING LOADED HOOKS

(76) Inventor: Walter Sanner, 146 Inges Ct., Shepherdsville, KY (US) 40165

( * ) Notice: Subject to any disclaimer, the term of this patent is extended or adjusted under 35 U.S.C. 154(b) by 0 days.

(21) Appl. No.: 10/008,706

(22) Filed: Dec. 6, 2001

(51) Int. Cl.[7] .............................................. A01K 83/02
(52) U.S. Cl. ........................................................ 43/36
(58) Field of Search ........................... 43/34–37, 6, 15, 43/41, 42.41

(56) References Cited

U.S. PATENT DOCUMENTS

| | | | | |
|---|---|---|---|---|
| 1,172,780 A | * | 2/1916 | Ferree | 43/35 |
| 2,522,808 A | * | 9/1950 | Adams | 43/35 |
| 2,544,782 A | * | 3/1951 | Fawcett | 43/35 |
| 2,896,355 A | * | 7/1959 | Dean et al. | 43/35 |
| 3,574,265 A | * | 4/1971 | Gibbons | 43/35 |
| 3,816,953 A | * | 6/1974 | Hameen-Anttila | 43/35 |
| 3,981,094 A | * | 9/1976 | Leffel | 43/35 |
| 4,446,647 A | | 5/1984 | Kahl | |
| 4,760,665 A | * | 8/1988 | Stueber | 43/36 |
| 4,947,574 A | | 8/1990 | Tapley | |
| 5,036,617 A | * | 8/1991 | Waldrip | 43/41 |
| 5,050,332 A | | 9/1991 | Cross | |
| 5,802,758 A | | 9/1998 | Frehling | |

* cited by examiner

*Primary Examiner*—Charles T. Jordan
*Assistant Examiner*—Kimberly S. Smith
(74) *Attorney, Agent, or Firm*—Polster, Lieder, Woodruff & Lucchesi, L.C.

(57) ABSTRACT

A fishing lure (10) includes a housing (14) in which a pair of fishing hooks (12) are enclosed. One end of each hook is secured to a spring (50) loaded plunger (40) held in a hook retracted position by a trigger (70). The trigger is activated when a fish bites on the lure. When the trigger is activated, the plunger is released and the spring drives it forward. The plunger drives the hook end (18) of the hooks into the sides of the fish's mouth to set the hooks. Because the hooks are rapidly set, the fish has no time to react and spit out the lure. Also, the hooks are driven into the fish's mouth with sufficient force they cannot now be dislodged by movements of the fish.

14 Claims, 5 Drawing Sheets

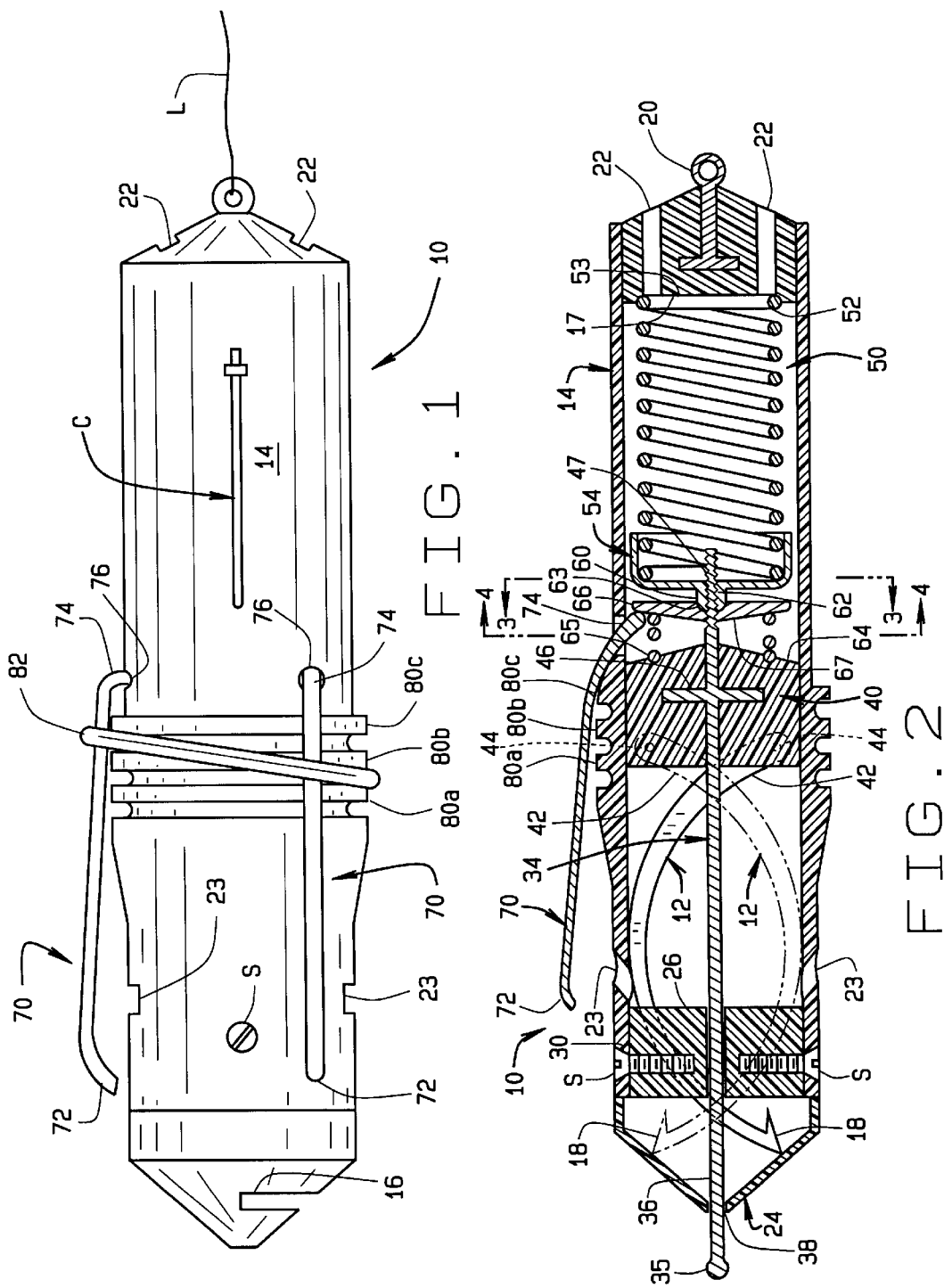

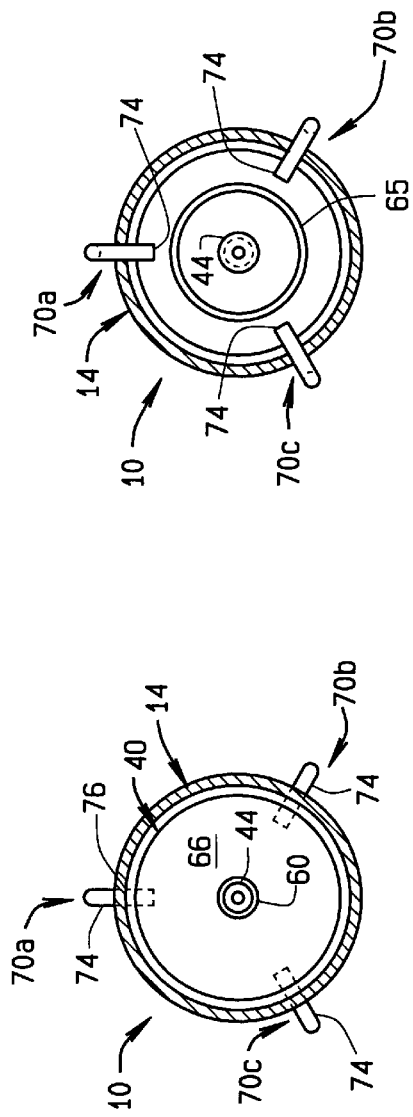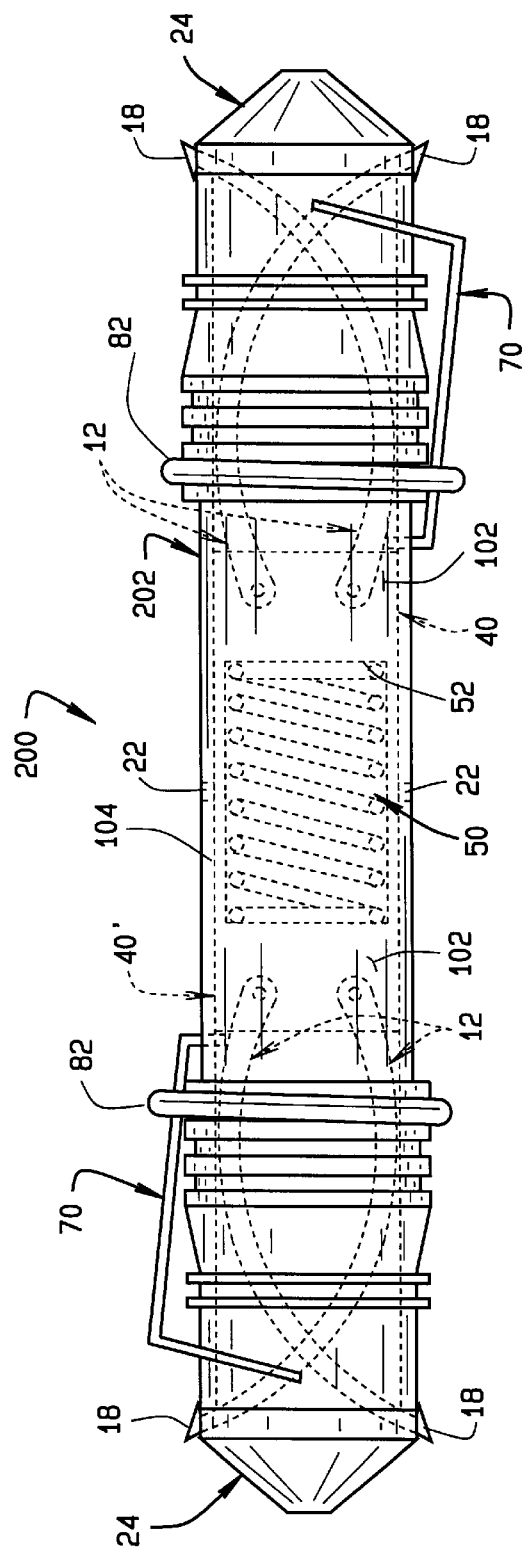

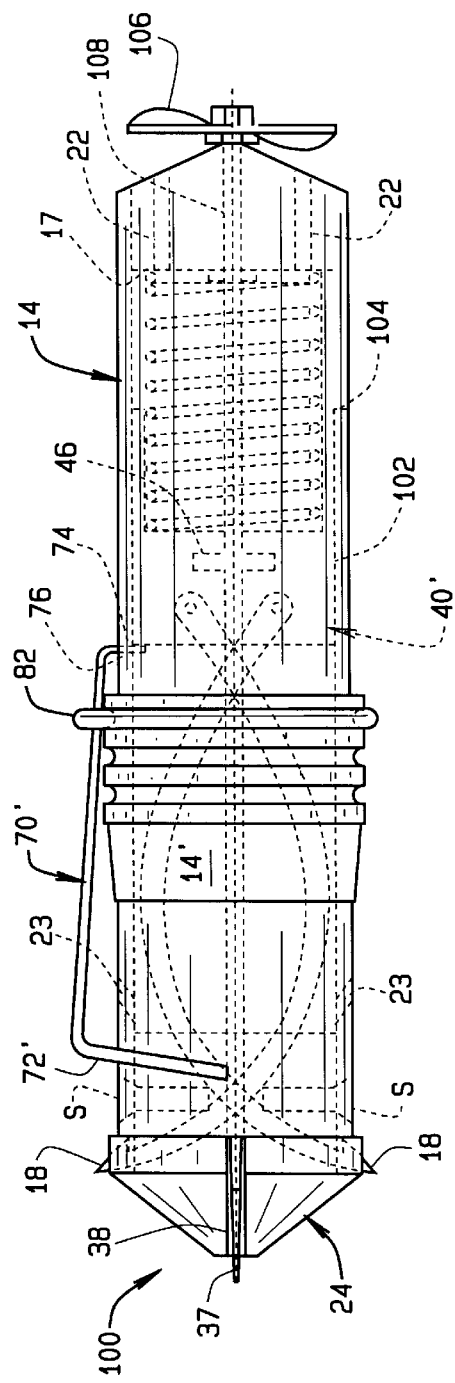
FIG. 6
FIG. 9
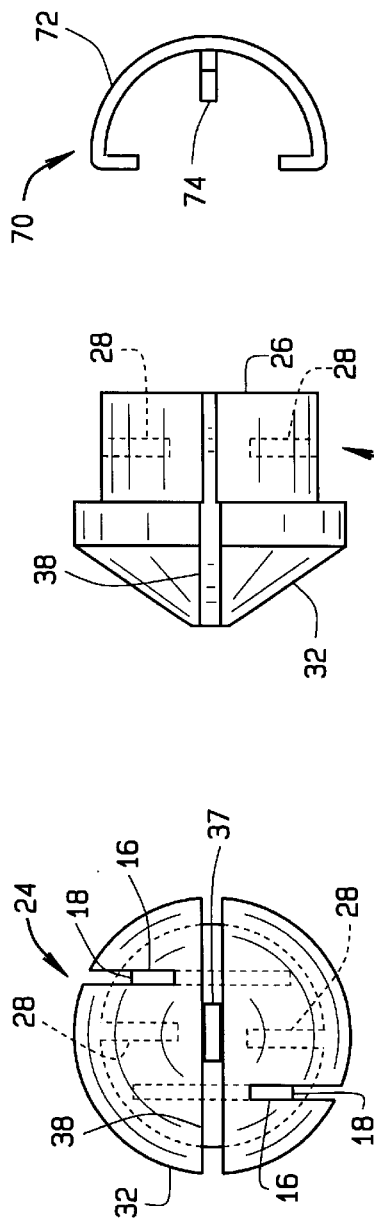
FIG. 8B
FIG. 8A

US 6,574,908 B1

FISHING LURE WITH SPRING LOADED HOOKS

CROSS REFERENCE TO RELATED APPLICATIONS

STATEMENT REGARDING FEDERALLY SPONSORED RESEARCH OR DEVELOPMENT

BACKGROUND OF THE INVENTION

This invention relates to fishing lures; and more particularly, to a spring loaded fish hook device which, when triggered by a fish seizing the lure, forcefully sets a pair of fish hooks in the fish's mouth so the fish cannot get free of the lure.

It is known that a large number of fish which would otherwise be caught get away because the fish hook they snatch onto does not properly set and hook them. A fish may feel the hook when it takes the bait dangling from a lure and spit the hook out before being hooked. Or, the fisherman feels the fish on the line and tries to set the hook too quickly. In this instance, the fish usually gets the bait and escapes. One of the most exasperating experiences for a fishermen is to hook a fish, work it for an extended period of time, get the fish almost to the shore or boat where it can be netted or gaffed, and then, at the last instance, have the fish work free of the hook and get away. This frustration occurs regardless of whether the fisherman intends to keep the fish, or release it after it is caught.

The present invention employs a pair of fish hooks spring loaded to set the hooks in the fish's mouth when it takes the bait. Such devices are known in the art. See, for example, U.S. Pat. Nos. 5,802,758, 5,050,332, 4,947,574, and 4,446, 647. However, the device of the present invention incorporates a variety of features not taught by this prior art. For example, the hooks are encapsulated in a housing which prevents the lure from snagging on underwater plants through which the device is drawn. Importantly, the hooks are not released until the lure is well inside the fish's mouth; and when released, are driven into the sides of the fish's mouth with sufficient force that the fish cannot subsequently work free of them. This instant setting of the hooks does not give the fish time to react to their release and spit out the lure. The amount of force required to trigger release of the hooks is adjustable so the lure can be used with different size fish by making a simple adjustment to the device.

BRIEF SUMMARY OF THE INVENTION

Among the several objects of the present invention is the provision of a spring loaded fishing hook device comprising a fishing lure. The lure includes a tubular housing in which are enclosed a pair of fishing hooks. The hook ends of the hooks are located in a forward end of the housing, and channels are formed in this end of the housing to guide the hooks when they are released by a fish seizing the lure. The other ends of the hooks are secured to a spring loaded plunger which is held in a hook retracted position by a trigger. The trigger is activated by the fish when it bites on the lure. When the trigger is operated, the plunger is released and the spring drives it forward through the housing. The hook ends of the hooks are driven into opposite sides of the fish's mouth to set the hooks. Because the hooks are rapidly set, the fish has no time to react to spit out the lure. Also, the hooks are driven into the fish's mouth with sufficient force they cannot now be dislodged by movements of the fish. The lure is a relatively low cost device, which readily attaches onto a fishing line. The trigger mechanism is readily adjustable so the lure can be used with both small and large fish. Importantly, the lure has no exposed hooks so a fish will not feel them until they are released when the fish activates the trigger by taking bait on the lure. Further, once the hooks are set, they are locked in their extended position by the trigger and the tension of the main spring and can be retracted only after the trigger is released. Resetting the hooks after they are removed from a fish's mouth is easily accomplished and a tool is provided with the lure to aid the fisherman in priming the lure before casting it into the water. Also, the fish cannot swallow the hooks. The hooks, when released, reach a spread, from tip to tip, from 2" to 3" depending upon the size of the hook. Rather, they remain in its mouth thus making it easier for the fisherman to remove them. This also reduces the amount of harm done to the fish so if the fisherman is a "catch and release" sportsman, the fish's chances of survival after release are increased.

Various embodiments of the lure are disclosed, including a double ended lure. Other objects and features of the invention will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

FIG. 1 is an elevational view of a first embodiment of the fishing lure of the present invention;

FIG. 2 is a sectional view of the lure;

FIGS. 3 and 4 are respective sectional views taken along lines 3—3 and 4—4 in FIG. 2;

FIG. 5 is a sectional view of a second embodiment of the fishing lure of the invention which is a double ended lure;

FIG. 6 is an elevational view of a third embodiment of the fishing lure with the hooks retracted;

FIGS. 8A and 8B are respective end and side elevational views of a plug fitted into one end of a housing of the fishing lure;

FIG. 9 is an end view of a trigger mechanism for the fishing lures; and,

Corresponding reference characters indicate corresponding parts throughout the several views of the drawings.

DETAILED DESCRIPTION OF INVENTION

Figure 7:
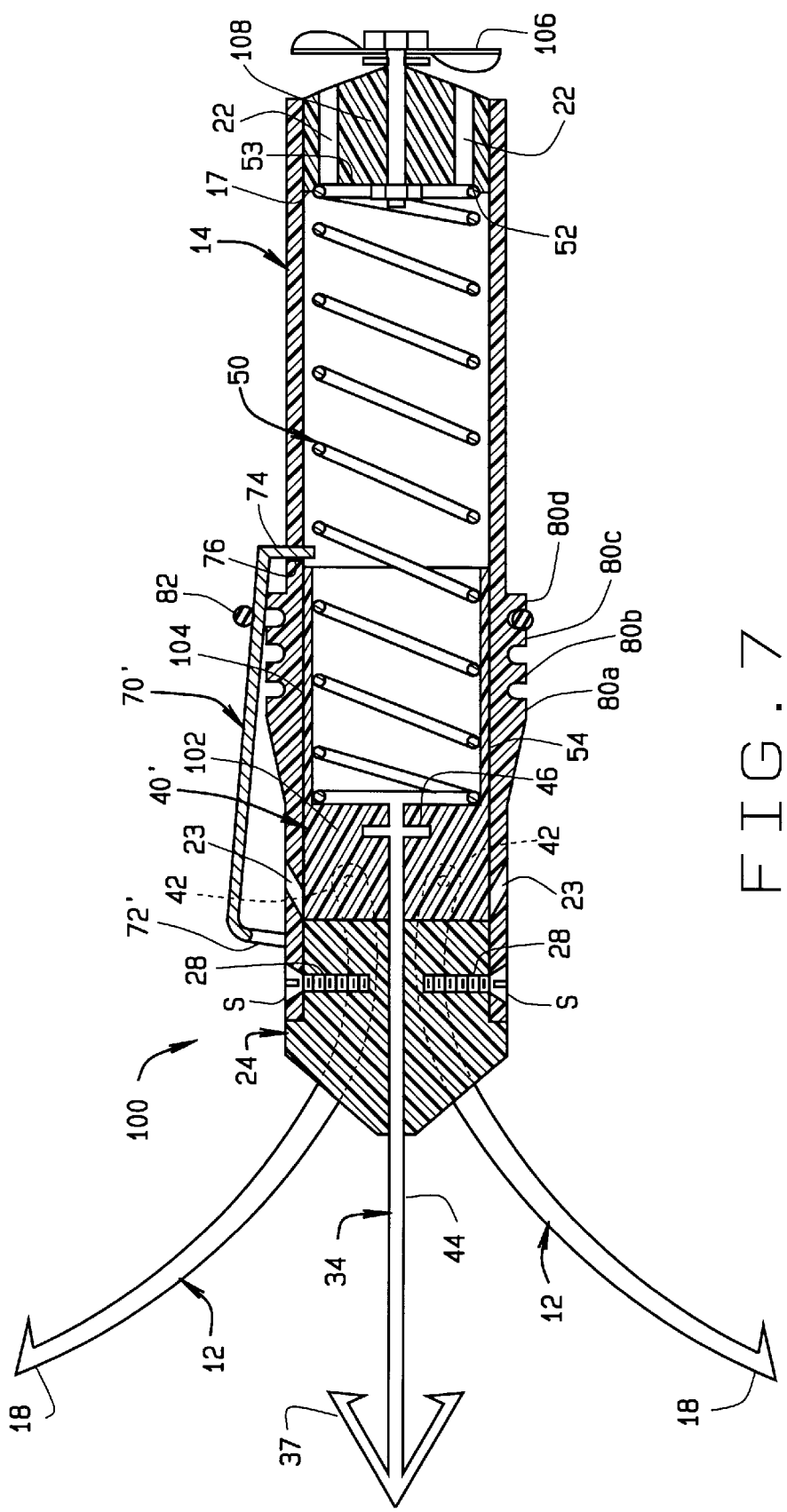
FIG. 7 is a sectional view of the lure of FIG. 6 with the hooks extended.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Referring now to the drawings, a fishing lure of the present invention for use in catching fish is indicated generally 10. The lure includes a pair of fish hooks 12 (see FIG. 2) which are installed in a hollow, tubular housing 14. One end of housing 14 is closed by a plug 24. As described hereinafter, the plug has openings 16 through which hook ends 18 of the fish hooks 12 extend to hook a fish. The other end of the housing is closed by a plug 17. A ring 20 extends projecting from plug 17 is used to attach the lure to the end of a fishing line L. Housing 14, and plugs 17 and 24, are all of a molded plastic material, so to provide a lightweight lure. Plug 17 further includes water inlet openings 22 extending completely through the plug. Water outlet or vent openings 23 are formed intermediate the length of the lure. These openings 22 and 23 allow water to flow through the lure when it is submerged. In addition, a clip C, as shown in FIG. 1 can be attached to the side of the housing for holding live bait. The outer surface of housing 14 can have a variety of finishes and can have a number of ornamental attachments for attracting fish.

Further with respect to plug 24, it includes a hollow, round base 26 whose outer diameter corresponds to the inner diameter of housing 14 at the open end of the housing; this allowing the plug to be installed in the open end of the housing. Opposed screw holes 28 extend inwardly into the sidewall of the base. Corresponding openings 30 are formed in housing 14 for screws S to be used to attach the plug to the housing. A head 32 of plug 24 includes a plurality of the openings 16 defined by channels extending through the plug to guide movement of the fish hooks when their hook ends 18 are projected from the lure and set into the fish. Both channels 16 are generally rectangular so to accommodate the fish hooks, both of which are relatively thin and flat along their length.

As shown in FIGS. 2, 6 and 7, lure 10 may also include a spear 34 includes a shaft 36 extending through an opening 38 in the outer, head end 32 of plug 24. In FIG. 2, an outer end of the shaft is shown to have a ball 35 attached to it. In FIGS. 6 and 7, the outer end of the shaft has a spear point 37 formed on it. As shown in the drawings, spear 34 is axially aligned with the longitudinal axis of the lure. Whereas the channels defined by the openings 16 are offset from a centerline of the plug as shown in FIG. 8A, opening 38 extends across plug head 32, transversely of the longitudinal axis of the lure, to provide an opening for the tip end 37 of the spear.

A plunger 40 installed in housing 14 is reciprocally movable within the housing. Ends 42 of each hook 12, the ends opposite the hook ends, are secured to plunger 40 as shown in FIG. 2 using pins 44 which allow rotary movement of the hooks as they reciprocally move within the housing. It will be understood that the hooks can be replaced or exchanged for hooks of a different size by removing the screws S and extracting plunger 40 from the housing 14. Shaft 36 of spear 34 has a plate 46 formed intermediate its length, the plate being encapsulated within plunger 40. This allows the spear to move as the plunger moves. Spear shaft 36 extends further into housing 14 beyond plate 46 and through and beyond the inner end of the plunger. The inner end of the shaft is threaded, as indicated at 47. When plunger 40 is in its retracted position shown in FIG. 2, the ball end 35 of the spear is drawn against head 32 of plug 24. When plunger 40 is released, as described hereinafter, the ball end of the spear is driven into the fish's mouth. If the end of the spear is tipped, then as shown in FIG. 6, the tip end of the spear is retained in channel 38. Similarly, the hook ends of the fish hooks 12 are also retained in their respective channels 16, as shown in FIG. 8A. When plunger 40 is released and driven to its extended position, as shown in FIG. 7, both the tip end of the spear and the fish hooks are driven out of the head of plug 24. As shown in the drawings, both fish hooks 12 are curved hooks, and their action when the plunger is driven forward is a scissoring action.

A spring 50 is installed in housing 14. One end 52 of the spring seats in a groove 53 at the inner end of plug 17 to avoid rubbing and friction. The opposite end of the spring bears against a cap 54 which is sized to fit over this end of the spring. On the outer end of the cap a ball 60 is formed. A threaded bore 62 extends through ball 60 and the threaded, inner end of shaft 36 is received in this bore. A circular disk or plate 66 is interposed between an inner end 64 of plunger 40 and cap 54. Ball 60 on the outer end of cap 54 is received in a socket ball 63 formed on the abutting, inner face of plate 66. One end of a leveling spring 65 seats against inner end 64 of plunger 40, and the other end of the spring bears against an outer face 67 of the plate. It will be appreciated that different strength springs 50 can be used in the lure. For example, if the lure is used to catch large fish, a stronger spring 50 is used (so to create more force in setting the hooks) than if the lure is used to catch smaller sized fish.

A plurality of triggers 70 for releasing plunger 40 are spaced about the circumference of housing 14. Three such triggers 70a–70c are shown in FIGS. 3 and 4, the triggers being spaced approximately 120° apart from each other. Use of a plurality of triggers is advantageous because their use insures activation of the plunger and release of the hooks regardless of the orientation of the lure when swallowed by the fish. Each trigger 70 is separately operable by a fish, meaning that when the fish bites down on the lure it will cause one of the triggers to move. As shown in FIGS. 1 and 2, each trigger comprises a lever having a flat, curved outer end 72 located outside of housing 14 near the plug 24 end of the housing, and an inner, curved end 74 which fits through an opening 76 in the sidewall of the housing. Ends 74 of the triggers are inserted through the openings in the housing and extend into the interior of the housing so as to bear against surface 67 of plate 66.

A series of spaced ribs 80a–80c are formed on the outer surface of housing 14, and extend circumferentially about the outside of the housing. In the embodiment shown in FIGS. 1 and 2, three such ribs 80a–80c are shown; while in the embodiment of FIGS. 6 and 7, four such ribs 80a–80d are formed on the outside of the housing. These ribs are located intermediate the length of the housing and forward of the openings 76 in the sidewall of the housing through which ends 74 of the triggers are inserted into the housing. These ribs define pivots about which the levers formed by the triggers 70 rotate when a fish bites down on one of the triggers. An O-ring 82 fits over housing 14 and about the triggers. The O-ring also fits over one of the ribs 80a–80c. Depending upon which rib the ring fits over, the force required by the fish to move a trigger by biting down on it varies. The position of the ring is adjustable for the size of fish being caught using the lure. Less force is desired for smaller fish, and more force for a larger fish.

As shown in FIGS. 2–4, ends 74 of the triggers 70 rest upon face 67 of disk 66. When in their position shown in FIG. 2, the ends 74 of the triggers bearing upon disk 66 prevent spring 50 from driving plunger 40 forward. The plunger is in a retracted position and the fish hooks and spear are maintained within the housing. Spring 65 maintains plate 66 in a level position by balancing the forces exerted on the plate by the three triggers. The leveling spring insures that the plate is not biased with respect to any one of the triggers.

When a fish bites down sufficiently hard on one of the triggers 70, the trigger rotates about its pivot and end 74 of the trigger is drawn up into its associated opening 76 in housing 14. The end of the trigger is now clear of the plate. Plate 66 is now unbalanced and tips away from the ends 74 of the other, unreleased triggers. This removes the constraint on spring 50 exerted by the triggers and the spring now drives plunger 40 forward to its extended position similar to that shown in FIG. 7. The fish hooks 12 are driven into the sides of the fish's mouth and with their hook ends 18 being set in the sides of the mouth before the fish can react and spit out the lure. The hooks are locked in their extended positions by the triggers 70 and spring 52. When the lure is so triggered, the vents 23 allow water in housing 14 forward of plunger 40 to escape from the housing. Otherwise, the water creates a cushioning effect which would prevent the hooks from being driven as forcefully as they could be.

Figure 10:
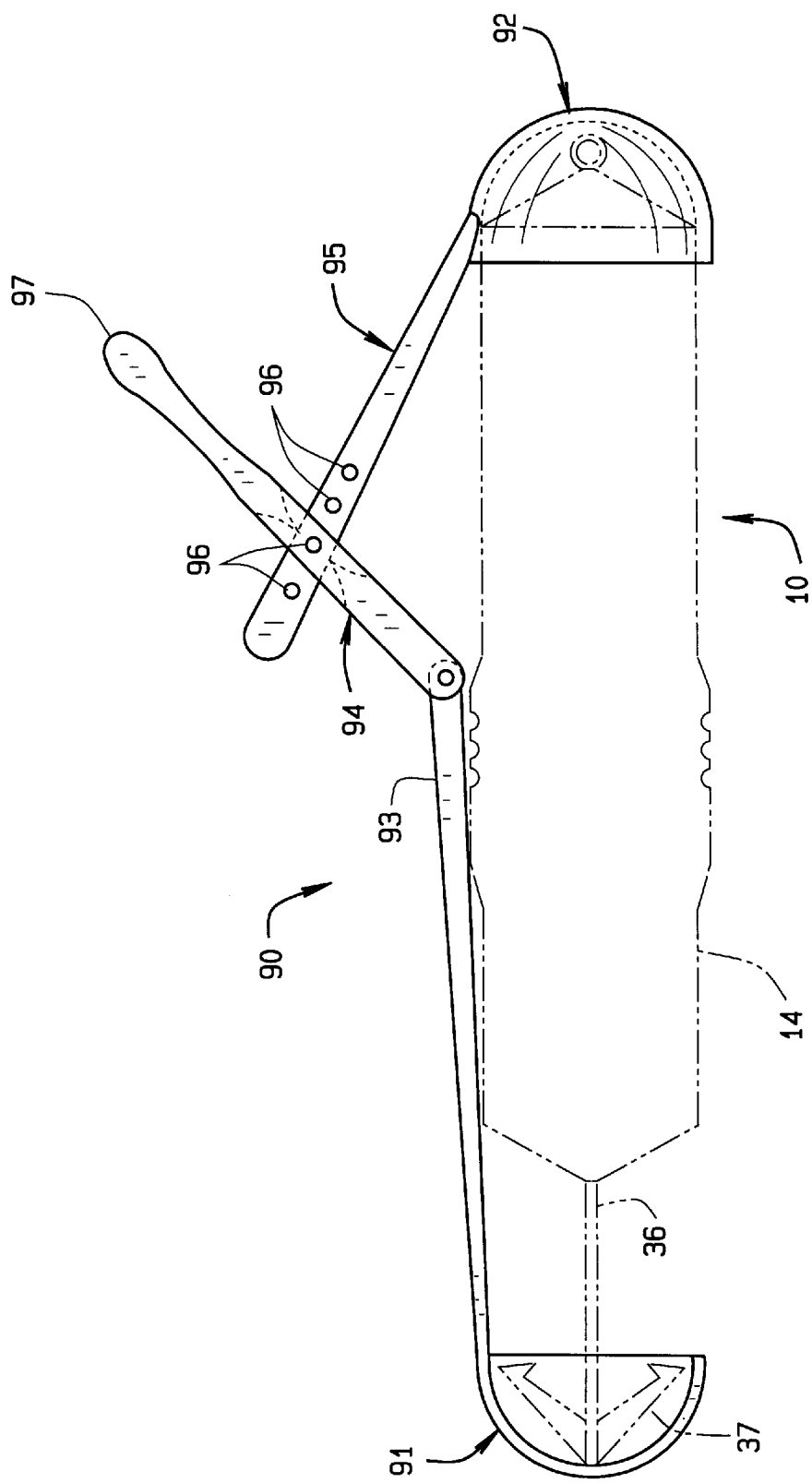
FIG. 10 is a sectional view of tool provided with the lure to both set the hooks in the lure and for releasing fish caught with the lure.

Once the fish is caught and the hooks are removed, the lure can be reset by pressing against the ball or tip end of the spear with a hard object. This is done to push plunger 40 rearwardly in housing 14 until the ends 74 of the triggers 70 reengage plate 66 to hold the plate in its position shown in FIG. 2. Alternately, and as shown in FIG. 10, a tool 90 includes a cup 91 which fits over tip end 37 of spear 34. Another cup 92 of the tool fits over the opposite end of the lure. A reset arm 93 extends from cup 91. One end of a first lever arm 94 is movably attached to arm 93. A second lever arm 95 extends from cup 92. The two lever arms are connected together intermediate their lengths at an adjustable pivot point 96. To reset the lure, the two cups are placed over the respective ends of the lure. The fisherman then pulls against end 97 of arm 94 in a counterclockwise direction (as viewed in FIG. 10). This causes the two cups 91 and 92 to be drawn toward each other, the movement pressing shaft 36 of the spear back into the housing and moving plunger 40 back to its retracted position.

Referring to FIGS. 6 and 7, another embodiment of the fishing lure of the present invention is indicated generally 100. The construction of this fishing lure is generally similar to the lure 10 previously described; except, this lure only uses a single trigger 70'. As shown in FIG. 9, the outer end of the trigger 70' comprises curved arms extending from each side of the main body of the trigger. The arms curve about the sidewall of the housing. In addition, the spring release to drive a plunger 40' from its retracted position of FIG. 6 to its extended position of FIG. 7 to set the hooks 12 and spear 34 differs from that previously described. Plunger 40' includes a front section 102 to which ends 42 of the hooks, and rear portion 46 of the spear are attached. The plunger further includes a rear section 104 which comprises a hollow cylinder in which end 54 of spring 50 is seated. When trigger 70' is set, the plunger is retracted as shown in FIG. 6 with flat end 74 of trigger 70' holding the plunger in place and with spring 50 compressed between the plunger and back wall 17 of housing 14. When the trigger is activated by the fish, pivoting of the trigger moves end 74 out of its blocking position, releasing the plunger to be driven forward by the spring. Finally, it will be noted that this embodiment includes a propeller 106 attached to the rear end of housing 14 by a shaft 108 extending through plug 17 of the housing. The propeller creates a wash and makes noise as the lure is drawn through the water, both of which attract fish.

Finally, referring to FIG. 5, an embodiment 200 of the invention comprises a lure including fish hooks extendible from each end of a housing 202. Housing 202 comprises a hollow, tubular housing open at each end. Each end is enclosed by a plug 24 as previously described and vent holes 23 are formed in the side of the housing for water to flow through the housing.

A pair of plungers 40' are installed in the housing and each plunger has the ends of a pair of fish hooks 12 attached to it. As described with respect to FIGS. 6 and 7, each plunger 40' includes a front section 102 to which ends 42 of the hooks are attached. The plunger includes a rear section 104 which comprises a hollow cylinder in which an end of spring 50 is seated. The hook ends 18 of the fish hooks extend through openings in their associated plug 24 when a trigger 70' is activated by a fish. Now, end 52 of spring 50 seats against a rear section 104 of one of the plungers, and end 54 of the spring seats against rear section 104 of the other plunger.

Two triggers 70' are employed with this embodiment of the lure, one trigger being installed at each end of the lure in the manner previously described. When both triggers are set as shown in FIG. 5, each plunger 40' is retracted with the ends 74 of the respective triggers holding the plungers is place. Spring 50 compressed between the plungers. When either trigger 70' is activated by a fish, pivoting of the trigger moves end 74 from its blocking position and releasing the associated plunger. The other plunger, however, is still held in place by its associated trigger. The hooks 12 of the now released plunger are driven forward by spring 50 driving the plunger from its retracted to its extended position.

In view of the above, it will be seen that the several objects and advantages of the present invention have been achieved and other advantageous results have been obtained.

Having thus described the invention, what is claimed and desired to be secured by Letters Patent is,

I claim:

1. A fishing lure for use in catching fish comprising:

first and second fish hooks;

a housing attached to a fishing line and in which the fish hooks are enclosed, the housing having openings therein through which barbed ends of the fish hooks are extended to set the hooks into the fish;

a plunger reciprocally movable in the housing and to which ends opposite the barbed ends of each fish hook are attached;

a trigger holding the plunger in a retracted position in the housing in which the barbed end of the fish hooks are withdrawn inside the housing, the trigger being activated by a fish seizing the lure with activation of the trigger releasing the plunger to move to an extended position in the housing with movement of the plunger driving the fish hooks out of the housing for the barbed ends of the hooks to be set into the fish, the trigger includes a plurality of levers spaced about the outside of the housing, one end of each lever being inserted in the housing to block movement of the plunger and the other end of each of which is external to the housing, whereby activation of any one trigger by a fish causes the trigger to move about a pivot and release the plunger;

spring means installed in the housing and engaging the plunger, the spring means driving the plunger from its retracted to its extended position when the trigger is activated, and;

a plate interposed between the plunger and the spring means with the one end of each of the levers bearing against one surface of the plate, and a leveling spring bearing against the same surface of the plate to balance the forces acting on the plate, activation of one of the levers by a fish unbalancing the plate to release the spring means to drive the plunger to its extended position.

2. The fishing lure of claim 1 further including guide means for guiding movement of the fish hooks through the openings in the housing.

3. The fishing lure of claim 2 wherein the housing includes a hollow cylinder with plugs fitting into each end of the cylinder, the guide means including channels formed in the plug at the end of the cylinder through which the fish hooks extend when the plunger is driven to its extended position.

4. The fishing lure of claim 1 wherein the fish hooks are curved hooks and are attached to the plunger so to plunge the fish hooks into the fish's mouth when the plunger is released.

5. The fishing lure of claim 1 wherein the pivot of the lever is adjustable to vary the amount of force required to trigger the lever.

6. The fishing lure of claim 1 including three levers equidistantly spaced about the housing.

7. The fishing lure of claim 5 further including a ring sized to fitted about the outside of the housing and over the lever to provide a pivot for the lever, the position of the ring along a length of the lever varying the pivot for the lever and the amount of force required to activate the trigger.

8. The fishing lure of claim 1 further including openings formed in the housing for water to flow through the housing as the lure is drawn through the water.

9. The fishing lure of claim 1 further including a tool for resetting the fish hooks after their release.

10. A fishing lure for use in catching fish comprising:

a pair of fish hooks;

a hollow, tubular housing open at one end and attached to a fishing line, the fish hooks being installed in the housing and a plug being fitted in the open end of the housing and having openings formed therein through which barbed ends of the fish hooks are driven to set the hooks in the fish;

a plunger reciprocally movable in the housing and to which ends opposite the barbed ends of each fish hook are attached;

a plurality of triggers spaced about the circumference of the housing each of which is separately operable by a fish, the triggers holding the plunger in a retracted position in which the barbed end of the fish hooks are maintained inside the housing, activation of any of the triggers by the fish releasing the plunger to move to an extended position and drive the fish hooks out of the housing for the barbed ends of the hooks to be driven into the fish's mouth to set the hooks; and, spring means installed in the housing and engaging the plunger, the spring means driving the plunger from its retracted to its extended position when one of the triggers is activated.

11. The fishing lure of claim 10 wherein each trigger comprises a lever, one end of which is inserted in the housing to block movement of the plunger and the other end of which is external out of the housing, whereby activation of the trigger by a fish causes the trigger to move about a pivot and release the plunger.

12. The fishing lure of claim 11 wherein the pivot of the levers is adjustable to vary the amount of force required to trigger the lever, the fishing lure including a ring sized to fit about the outside of the housing and over the levers to provide a pivot for the levers, the position of the ring along a length of the levers varying the pivot for the levers and the amount of force required to activate the trigger.

13. The fishing lure of claim 12 further including a plate interposed between the plunger and the spring means with the one end of each of the levers bearing against one surface of the plate, and a leveling spring bearing against the same surface of the plate to balance the forces acting on the plate, activation of one of the levers by a fish unbalancing the plate to release the spring means todrive the plunger to its extended position.

14. The fishing lure of claim 10 further including a tool for resetting the fish hooks after their release.

* * * * *